United States Patent
Avati et al.

(10) Patent No.: US 9,648,103 B2
(45) Date of Patent: May 9, 2017

(54) NON-UNIFORM FILE ACCESS IN A DISTRIBUTED FILE SYSTEM

(71) Applicant: Red Hat, Inc., Raleigh, NC (US)

(72) Inventors: Anand Avati, Mountain View, CA (US); Jeffrey Darcy, Lexington, MA (US)

(73) Assignee: Red Hat, Inc., Raleigh, NC (US)

(*) Notice: Subject to any disclaimer, the term of this patent is extended or adjusted under 35 U.S.C. 154(b) by 199 days.

(21) Appl. No.: 14/178,222

(22) Filed: Feb. 11, 2014

(65) Prior Publication Data
US 2015/0227537 A1 Aug. 13, 2015

(51) Int. Cl.
G06F 17/30 (2006.01)
H04L 29/08 (2006.01)

(52) U.S. Cl.
CPC .... *H04L 67/1097* (2013.01); *G06F 17/30194* (2013.01)

(58) Field of Classification Search
CPC .................................................. G06F 17/30094
See application file for complete search history.

(56) References Cited

U.S. PATENT DOCUMENTS

| | | | |
|---|---|---|---|
| 6,023,706 A | 2/2000 | Schmuck et al. | |
| 7,281,168 B1* | 10/2007 | Coates | G06F 11/2056 714/1 |
| 8,290,919 B1 | 10/2012 | Kelly et al. | |
| 8,554,867 B1* | 10/2013 | Mueller | G06F 17/30203 709/203 |
| 2002/0161850 A1 | 10/2002 | Ulrich et al. | |
| 2007/0088669 A1* | 4/2007 | Jaschek | G06F 17/30132 707/999.001 |
| 2013/0110961 A1 | 5/2013 | Jadhav | |
| 2013/0290463 A1* | 10/2013 | Myrah | G06F 3/0617 709/213 |
| 2015/0212902 A1* | 7/2015 | Horspool | G06F 11/1464 707/654 |

FOREIGN PATENT DOCUMENTS

CN 102566942 A 7/2012

OTHER PUBLICATIONS

Rowstron et al., "Storage Management and Caching in PAST, a Large-Scale, Persistent Peer-to-Peer Storage Utility," Published on Jan. 2001, http://dl.acm.org/citation.cfm?id=502053.
"Translators/Cluster," Retrieved on Oct. 25, 2013, http://gluster.org/community/documentation/index.php/Translators/cluster.
(Continued)

*Primary Examiner* — Khanh Pham
(74) *Attorney, Agent, or Firm* — Lowenstein Sandler LLP

(57) ABSTRACT

Data connections from a remote login session are identified and an identification query may be transmitted by the remote login session to endpoints (e.g., servers) of the data connections. In response to the identification query, identification information may be received from the endpoints. Furthermore, the identification information may be compared with a local identification of a local server that hosts the remote login session. A file created by the remote login session may be stored at an endpoint over a data connection where the local identification matches a portion or all of the identification information of the endpoint of the data connection.

18 Claims, 7 Drawing Sheets

(56) References Cited

OTHER PUBLICATIONS

Juve, "Resource Management for Scientific Workflows," Retrieved on Oct. 25, 2013, http://www.isi.edu/~gideon/publications/JuveG-Dissertation.pdf.
"Massive Distributed Storage," Retrieved on Oct. 25, 2013, http://www.openfabrics.org/archives/2007infiniband/09_Z%20Research.pdf.
Bent et al., "PLFS: A Checkpoint Filesystem for Parallel Applications," Published on Jan. 1, 2009, http://repository.cmu.edu/cgi/viewcontent.cgi?article=1730&context=compsci.
Butt et al., "Kosha: A Peer-to-Peer Enhancement for the Network File System," Published on Nov. 6, 2012, http://citeseerx.ist.psu.edu/viewdoc/download?doi=10.1.1.121.5654&rep=rep1&type=pdf.
Demmer et al., "The Arrow Distributed Directory Protocol," Published on Jan. 1, 1998, http://link.springer.com/chapter/10.1007/BFb0056478.
Dabek et al., "Wide-Area Cooperative Storage with CFS," Retrieved on Oct. 25, 2013, https://web.cs.dal.ca/~abrodsky/7301/readings/DaKaKaMoSt01.pdf.

* cited by examiner

NON-UNIFORM FILE ACCESS IN A DISTRIBUTED FILE SYSTEM

TECHNICAL FIELD

Aspects of the disclosure relate generally to file access and, more specifically, relate to non-uniform file access in a distributed file system.

BACKGROUND

A distributed file system may be a file system that stores data across multiple servers. For example, files may be stored in the distributed file system across multiple storage resources that are managed by multiple servers. Users may access the distributed file system by logging in to a client system and requesting access to read files that are stored in the distributed file system or to write files to be stored in the distributed file system.

The users of a client system may remotely access the distributed file system. Multiple storage servers may each manage or be associated with a storage resource. The client system may be a remote system such that when the client system requests to access the distributed file system, any such requests may be transmitted to a storage server that manages a corresponding storage resource. For example, the client system may access the files stored in the distributed file system by remotely accessing files that are stored in the storage resources associated with the storage servers.

As such, in a conventional distributed file system, the client system may be a remote system with respect to the storage resources of the distributed file system. In order to access the data or files stored in the distributed file system, the client system may be required to remotely access the files.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
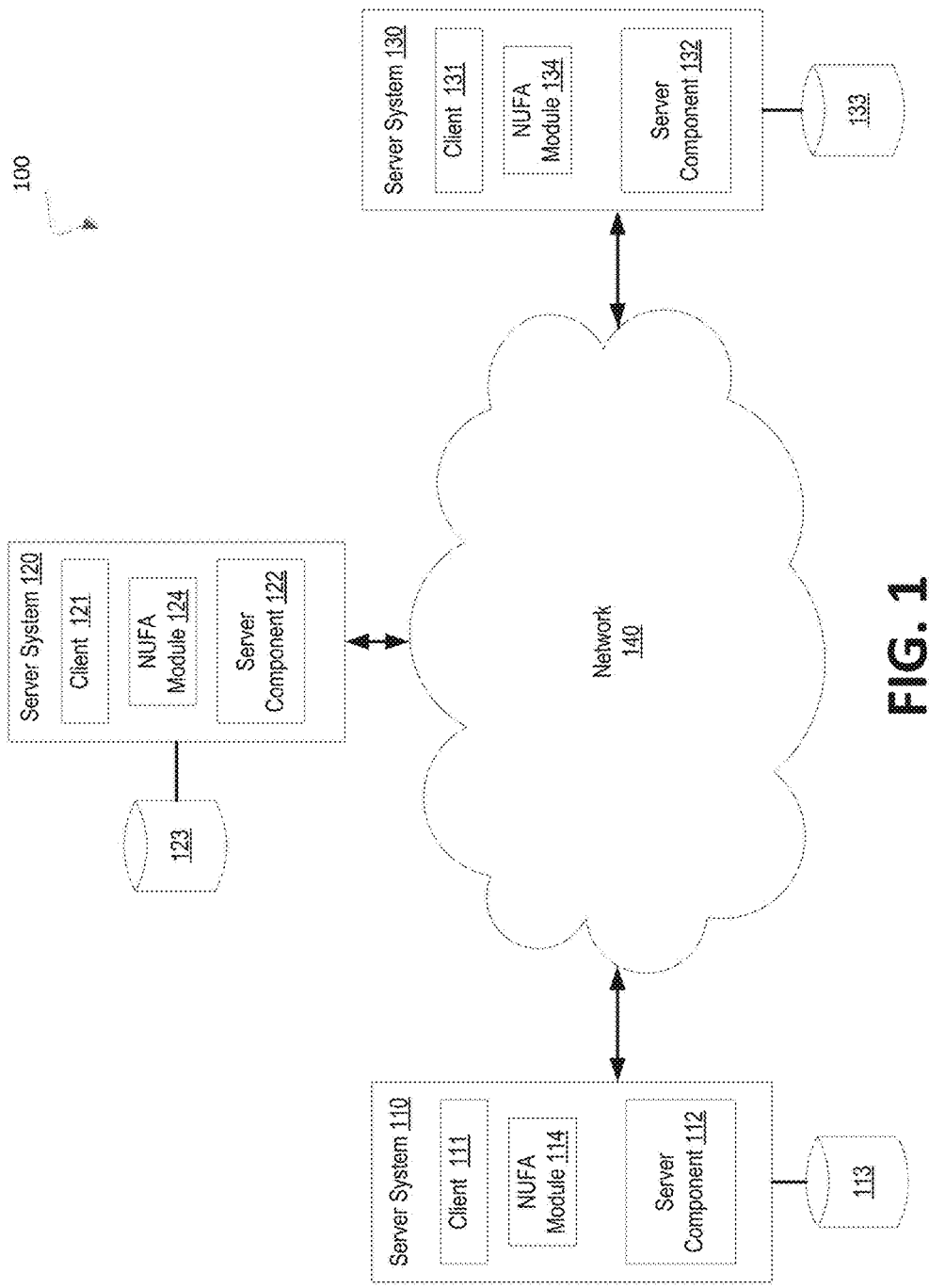
FIG. 1 illustrates an example system architecture in which embodiments of the disclosure may operate.

Embodiments of the disclosure support non-uniform file access (NUFA) in a distributed file system. A distributed file system may be a type of cloud infrastructure system including multiple servers that are part of the distributed file system. Each of the servers of the distributed file system may be associated with or manage a storage resource to store data or files. Non-uniform file access may refer to the storing of files in different locations of the distributed file system resulting in different access times or latency for a client system. For example, with respect to a particular client system, storing a file at a first storage resource of a first server may result in a different access time or latency as opposed to storing the file at a second storage resource of a second server within the same distributed file system.

The servers of the distributed file system may also be associated with a client system or client session. In some embodiments, the client session may be a remote user login session between a user computing system and another computing system. For example, the remote user login session may be an interaction between a remote user at a remote computer and a server system. In some embodiments, a client session may be partly run or hosted on a server system. The client session may thus run or execute applications for remote a user between the computing system of the remote user and the server system. Furthermore, the server system may further include a server component that provides server functionality in the distributed file system (e.g., access to a storage resource of the server system). As such, a single server system may include a client session functionality as well as a server component.

In some embodiments, the distributed file system may include multiple server systems that are each capable of running or hosting a client session as well as a server component to administer or manage server functionality for the server system in the distributed file system. As a result, a client session may be run on any server system in the distributed file system. For example, if a user logs in to a client session, the client session may be run or hosted at any of the server systems in the distributed file system. As the user writes or stores data or files in the distributed file system, the client session may transmit the data or files over data or network connections associated with the different server systems in the distributed file system. For example, a first data connection from the client session may transmit data or files to and from a remote server system. However, a second data connection from the client session may transmit data or files to and from the local server system (e.g., to the server component of the local server system) that hosts the client session.

Storing files from a client session at the local server system as opposed to a remote server system may result in faster access times or lower latency for the accessing of data or files when the client session issues a subsequent read request or when the client session issues a write request to store data or files. However, since the client session is hosted by the server system that is requested to store the files locally, the client session may not be able to identify the data or network connection that is associated with its own local server system.

In order to address the issue with the client session not being able to identify the data or network connection associated with its own local server system, a non-uniform file access (NUFA) module may be run within the local server system. The NUFA module may identify outbound data or network connections, analyze the outbound data or network connections for an endpoint identification, query the local server system for an identification, and compare the received endpoint identifications of the outbound data or network connections with the identification of the local server system. Files that are written by the client session may thus be transmitted to the outbound data or network connection that corresponds to the identification of the local server system.

FIG. 1 is an example system architecture 100 for various implementations of the disclosure. The system architecture 100 may include a distributed file system that includes multiple server systems 110, 120, and 130 that are coupled via a network 140. The network 140 may be a public network (e.g., the Internet), a private network (e.g., a local area network (LAN) or a wide area network (WAN)), or a combination thereof. Network 140 may include a wireless infrastructure, which may be provided by one or multiple wireless communications systems, such as a wireless fidelity (WiFi) hotspot connected with the network 140 and/or a wireless carrier system that may be implemented using various data processing equipment, communication towers, etc.

The system architecture 100 may be a distributed file system that includes one or more server systems 110, 120, and 130, each of which may control and manage any number of storage resources 113, 123, and 133. A storage server 110, 120, and 130 may include a network-accessible server-based functionality (e.g., storage component 112, 122, or 132) or other data processing equipment. The server systems 110, 120, and 130 may include, but are not limited to, any data processing device such as a desktop computer, a laptop computer, a mainframe computer, a personal digital assistant, a rack-mount server, a hand-held device, or any other device configured to process data. The server systems 110, 120, and 130 may be grouped into one or more clusters. A cluster may be a group of linked server systems 110, 120, and 130 working together closely to store data or files in a distributed file system.

The storage resources 113, 123, and 133 may be mass storage devices such as, but not limited to, magnetic or optical storage based disks, solid-state drives (SSDs), or hard drives coupled to the server systems 110, 120, and 130 (either directly or via the network 140). The storage resources 113, 123, and 133 may further include memory such as, but not limited to, random access memory (RAM), Flash memory, and so forth. For convenience, some embodiments provided herein may be described with reference to disks or other mass storage devices. However, it should be understood that such embodiments may also apply to memory storage resources.

Server systems 110, 120, and 130 may each host a client session (e.g., client sessions 111, 121, or 131) and a server component (e.g., server components 112, 122, or 132). For example, the server components may manage a local file system associated with a corresponding storage resource 113, 123, or 133. Each of the storage resources 113, 123, and 133 may be formatted in accordance with a particular local file system. The local file system may create directories, partitions, logical volumes, and so forth on the storage resources 113, 122, and 133 as well as store data (e.g., files) thereon. Examples of local disk file systems that may be used on disk storage resources include, but are not limited to, EXT3, EXT4, XFS, NTFS, FAT16, FAT32, and so forth. Various flash file systems, tape file systems, optical disc file systems, memory files systems, and so on may alternatively be used for other non-disk storage resources (e.g., for memory storage resources).

The server components of the server systems 110, 120, and 130 may each additionally include a distributed file system service or functionality. In some embodiments, the server components 112, 122, and 132 may provide the distributed file system service or functionality. The server components 112, 122, and 132 may interface with respective local file systems to store files on the storage resources 113, 123, and 133, as well as allow retrieval of stored files to a client session 111, 121, or 131. The server components 112, 122, and 132 may additionally interface with one another to form a distributed file system.

The distributed file system services provided by the server components 112, 122, and 132 may store data as files and may include directories, also referred to as folders, which are virtual containers within a distributed file system, in which groups of computer files and possibly other directories may be kept and organized. The distributed file system may organize data (e.g., files) in the storage resources 113, 123, and 133 using volumes. A volume may be a single accessible storage area of a distributed file system that may be resident on a single partition or directory of a storage resource 113, 123, and 133 or on multiple partitions or directories of multiple storage resources 113, 123, and 133. A volume may be a representation of a logical location, rather than a physical location, of a storage area in the distributed file system. For example, a physical hard disk-1 may have two partitions, partition-1 and partition-2. A volume label "C:" may be assigned to partition-1 and a volume label "D:" may be assigned to partition-2. Hard disk-1 is a physical disk and "C:" and "D:" are volumes representing logical locations on physical hard disk-1. Additionally, the volume may be a collection of multiple logical and/or physical locations.

In some embodiments, a volume of the distributed file system may be associated with multiple storage resources 113, 123, and 133. Files of a volume may be stored across the storage resources 113, 123, and 133. For example, a volume label "C:" may be assigned to a partition of a first storage resource 113, a partition of a second storage resource 123, and a partition of a third storage resource 133. As such, files of a single volume may be distributed between multiple storage resources 113, 123, and 133.

The server systems 110, 120, and 130 may host one or more client sessions 111, 121, and 131. In some embodiments, the client sessions may run an application. An application may be any type of software application including, but not limited to, a web application, a desktop application, a browser application, etc. An application running in a client session may request access (e.g., read, write, etc.) to the data or files stored in the storage resources 113, 123, and 133 of the distributed file system.

Each of the server systems may be associated with a non-uniform file access (NUFA) module 114, 124, or 134. For example, the NUFA module may provide non-uniform file access services to client sessions 111, 121, and 131. Implementations of the NUFA module are described in greater detail below with relation to FIG. 2.

Figure 2:
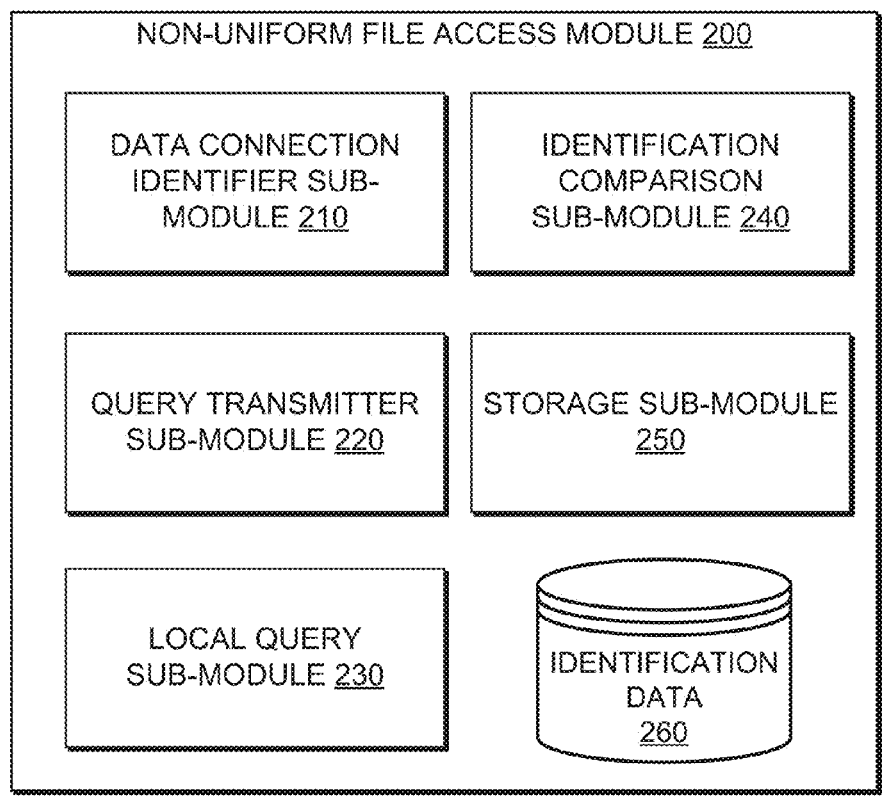
FIG. 2 illustrates an example non-uniform file access (NUFA) module in accordance with some embodiments of the disclosure.

FIG. 2 is a block diagram of an example non-uniform file access (NUFA) module 200 in accordance with some embodiments of the disclosure. In general, the NUFA module 200 may correspond to the NUFA modules 114, 124, and 134 of FIG. 1. The NUFA module 200 may include a data connection identifier sub-module 210, a query transmitter sub-module 220, a local query sub-module 230, an identification comparison sub-module 240, a storage sub-module 250, and an identification data sub-module 260. In alternative embodiments, the functionality of one or more of the sub-modules may be combined or divided.

As shown in FIG. 2, the NUFA module 200 may include a data connection identifier sub-module 210. In some embodiments, the data connection identifier sub-module 210 may identify data connections or network connections associated with a client session. For example, a client session may be hosted on a server system. As the client session issues write requests to store data in a distributed file system, the data or files corresponding to the write requests may be transmitted from the server system that hosts the client session to storage resources via the data connections. As such, the data connection identifier sub-module 210 may identify each of the data connections from which the client session transmits data or files from its local server system to storage resources of a distributed file system.

The NUFA module 200 may include a query transmitter sub-module 220. In some embodiments, the query transmitter sub-module 220 may transmit a query over the data connections that were identified by the data connection identifier sub-module 210. For example, the query transmitter sub-module 220 may transmit a query to an endpoint (e.g, a remote server, local server, etc.) of each of the data connections from which the client session transmits data or files to be stored in the distributed file system. In some embodiments, the transmitted query from the query transmitter sub-module 220 may be a request for the endpoint to return identification information of the endpoint of the data connection. As such, the query transmitter sub-module 220 may transmit a self identification query to the endpoints of the identified data connections and the endpoints may return identification information to the NUFA module 200.

Returning to FIG. 2, the NUFA module 200 may include a local query sub-module 230. In some embodiments, the local query sub-module 230 may query a local server system for identification information of the local server system. For example, a client session may be hosted on a particular server system in the distributed file system. The client session may issue a request or transmit a query to obtain identification information of the particular server system that is currently hosting the client session. In some embodiments, the client session may query an operating system associated with the client session and/or the local server system for identification information of the local server system.

In some embodiments, the identification information from the endpoints of the data connections and the local server system may include, but is not limited to, an Internet Protocol (IP) address, a host name, a domain name, or any other information that may be used to identify a server or other type of network component.

The NUFA module 200 may further include an identification comparison sub-module 240. In some embodiments, the identification comparison sub-module 240 may compare identification information from the endpoints of the data connections that is received by the NUFA module in response to the query transmitted by the query transmitter sub-module 220 with the identification information received in response to the local query performed by the local query sub-module 230. For example, the identification comparison sub-module 240 may match the identification information corresponding to the local server system of the client session with the identification information of one of the endpoints of one of the data connections. As such, the identification comparison sub-module 240 may identify a data connection that has an endpoint with an identity that matches the identity of the local server system that is hosting the client session.

As shown in FIG. 2, the NUFA module 200 may include an identification data sub-module 260. In some embodiments, the identification sub-module 260 may store information associated with server systems of the distributed file system. For example, the identification data sub-module 260 may store information associated the endpoints of the identified data connections. In some embodiments, the information may include, but is not limited to, locations of the server systems that are the endpoints of the data connections, the types of storage resources that are managed by the server systems that are the endpoints of the data connections, and so forth.

In some embodiments, the NUFA module 200 may include a storage sub-module 250. In the same or alternative embodiments, the storage sub-module 250 may store or create a file associated with a write request from a client session to a local storage resource managed by a server system that is hosting the client session.

Figure 3:
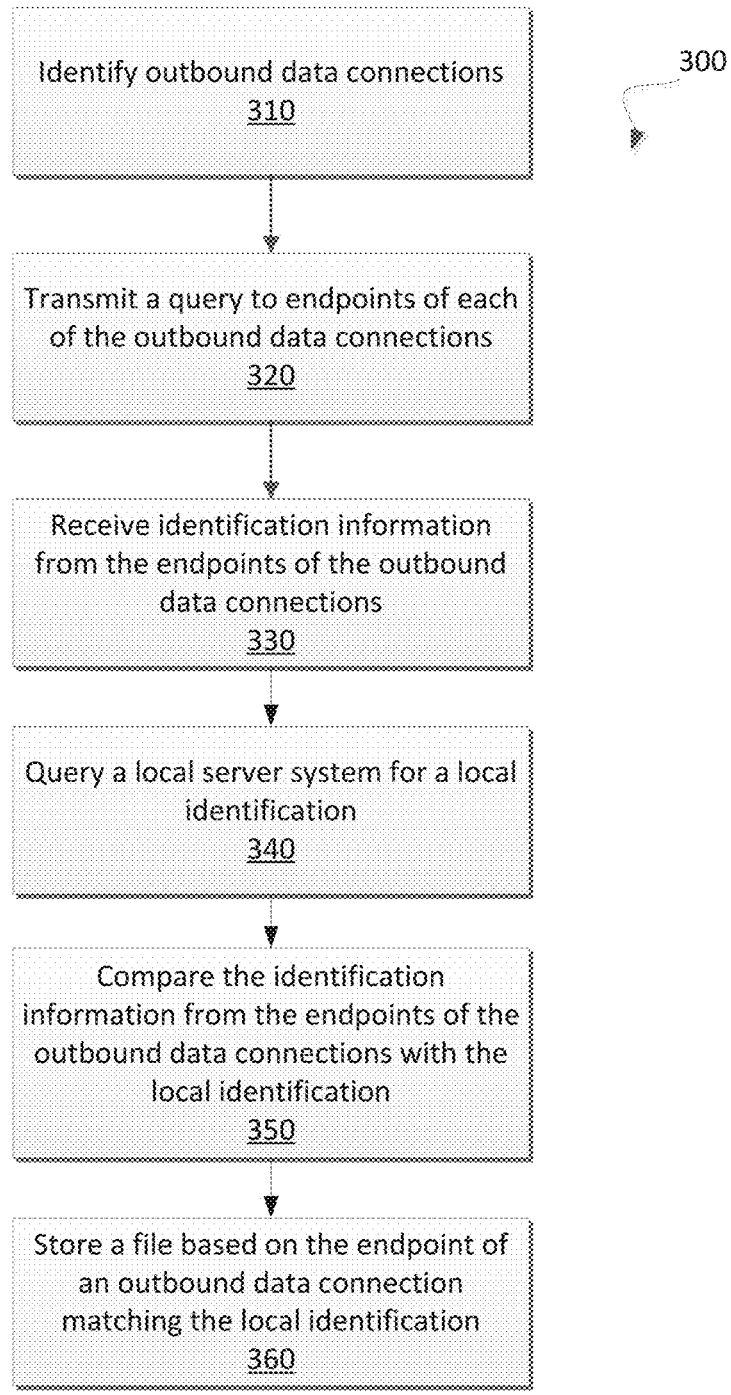
FIG. 3 is a flow diagram of an example method to store a file based on non-uniform file access in a distributed file system in accordance with some embodiments.

FIG. 3 is a flow diagram of an example method 300 to store a file based on non-uniform file access in a distributed file system. The method 300 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 300 may be performed by a NUFA module 114, 124, 134, or 200 of a server system associated with a distributed file system.

As shown in FIG. 3, the method 300 may begin by the processing logic identifying outbound data or network connections (block 310). In some embodiments, the processing logic may identify data or network connections to endpoints (e.g., server systems) where files of a volume are stored within a distributed file system. For example, a client session may mount or enable access to a volume including files stored within multiple storage resources that are each managed by a server system of the distributed file system. The processing logic may perform an operation on the root node of the volume to identify data connections associated with files stored in the volume under the root node. Furthermore, the processing logic may transmit a query to each of the endpoints or server systems (block 320). In some embodiments, the query may include a request for each of the endpoints or server systems to return identification information. As such, the processing logic may further receive identification information from the endpoints of the outbound data connections associated with the client session (block 330). For example, the processing logic may receive an IP address, a host name, a domain name, or any other type of identification for a resource or component on a network for each endpoint of each data connection to which the client session transmits data or files to be stored in the distributed file system.

In some embodiments, the processing logic may query a local server system for a local identification (block 340). For example, the processing logic may query an operating system associated with the client session to return identification information of the local server system that currently hosts the client session. Furthermore, the processing logic may compare the identification information received from the endpoints of the outbound data connections of the client session with the local identification received form the local server system (block 350). For example, the processing logic may match the identification of the local server system that hosts the client session with one of the endpoints of one of the data connections. In some embodiments, the processing logic may match the identification of the local server system with a portion of the identification information received from a single endpoint of a single data connection. For example, each storage resource that is managed by a server system may be associated with a replicated or backup storage resource. In such an example, each data connection associated with the client session may be associated with two or more endpoints. The endpoints may each correspond to a server system that manage a storage resource or may correspond to the storage resources themselves. For example, a first endpoint may be associated to a first server system and/or first storage resource and a second endpoint may correspond to a second server system or backup (or second) storage resource. The backup or second storage resource may replicate the first storage resource. In some embodiments, when the identification information is received in response to a query transmitted via the data connections, the identification information may include both the first endpoint and the second endpoint that is a backup copy of the first endpoint. As such, the processing logic may identify a data connection from which a portion of the identification information returned via the data connection matches matches the local identification. For example, a local identification may include an identification of a first server. The identification information returned via a first data connection may include an identification of the first server and an identification of a second server that is used to replicate the first server. The processing logic may identify that the local identification is included in a portion of the received identification information that has been returned via the first data connection. Furthermore, in some embodiments, the local identification may also include identification information for multiple entities. For example, the local identification may include an identification for the local server system and a backup of the local server system. As such, each of the local identification and the identification information received from each of the endpoints may be considered a set of identifiers or a set of identification information. For example, the local server system and server systems of the endpoints may be a host system that may be associated with multiple host names and/or multiple IP addresses. A host system may be a networked computing device (e.g., a server) that provides services (e.g., file storage) to other systems or users. In some embodiments, multiple host names and/or multiple IP addresses of the host system may be returned in response to the local identification and/or the identification information received from the endpoints. As such, a comparison between the set of identifiers from the local identification may be compared with the set of identifiers from the identification information received from each of the endpoints and a non-empty intersection (e.g., a partial match) between the local identification with the identification information from one of the endpoints may be identified.

Returning to FIG. 3, the processing logic may store a file based on the endpoint of an outbound data connection matching the local identification (block 360). For example, data or a file of a write request from a client session may transmitted to the data connection that includes the local server system as at least one endpoint and/or may be created at an endpoint of the data connection that includes the local server system.

Figure 4:
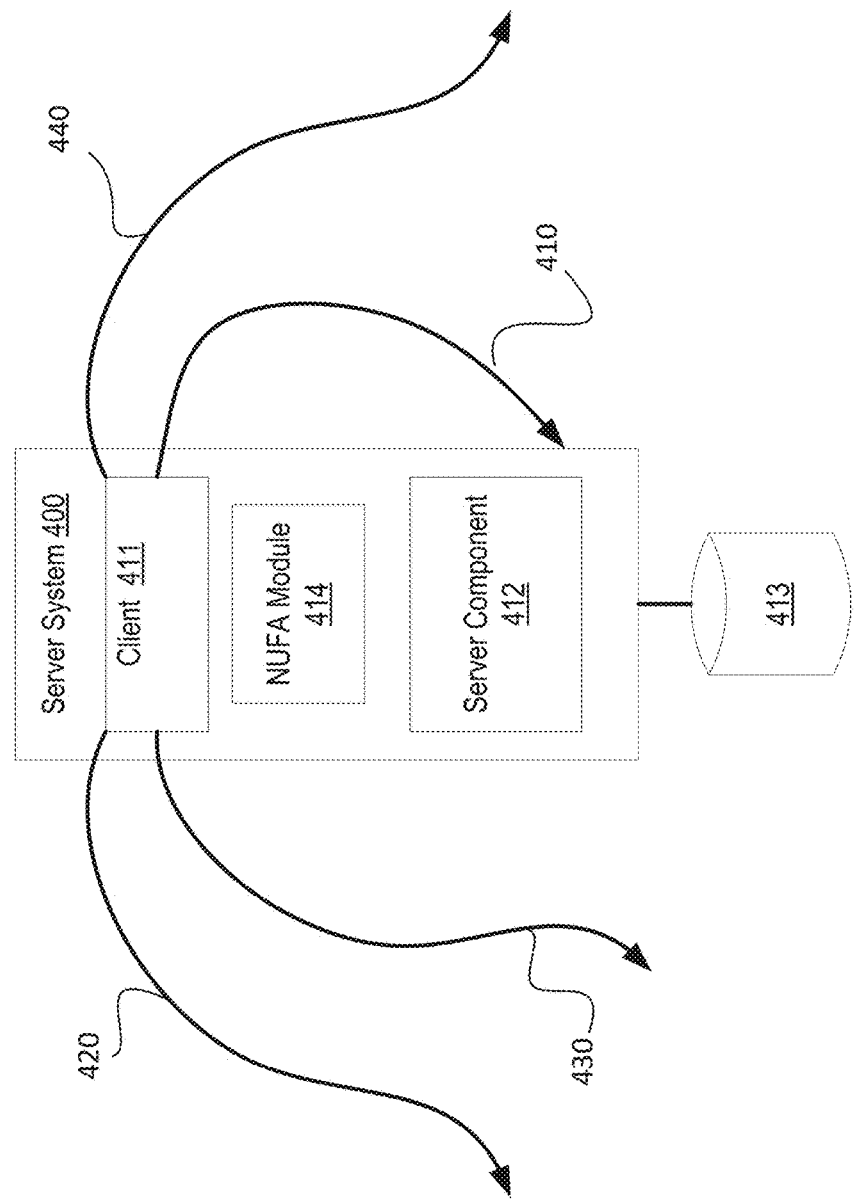
FIG. 4 is an illustrated example of data connections associated with a server system in accordance with some embodiments of the disclosure.

FIG. 4 is an illustrated example of data connections associated with a server system 400. In general, the server system 400 may include a client session 411 that corresponds to client sessions 111, 121, or 131, a NUFA module 414 that corresponds to NUFA modules 114, 124, 134, or 200, a server component 412 that corresponds to server components 112, 122, or 132 and a storage resource 413 that corresponds to storage resources 113, 123, or 133. Furthermore, the server system 400 may correspond to server systems 110, 120, or 130 of FIG. 1.

As shown in FIG. 4, the server system 400 may include a hosted client session 411 that is associated with a NUFA module 414 and the server system 400 may further include a server component 412 to provide distributed file system services. In some embodiments, the client session 411 may issue write requests to store data or files in the distributed file system. For example, in order to store data or file in the distributed file system, the client session 411 may store the data or files in storage resources of the distributed file system. In some embodiments, the client session may be coupled to the storage resources of the distributed file system via data or network connections 410, 420, 430, and 440. As an example, the data connection 420 may couple a first remote storage resource and/or a first remote server system with the client session 411, the data connection 430 may couple a second remote storage resource and/or a second remote server system with the client session 411, and the data connection 440 may couple a third remote storage resource and/or a third remote server system with the client session 411. Furthermore, the data connection 410 may couple be a connection between the client session 411 and the server system 400 that hosts the client session 411. For example, data or files transmitted by the client session 411 via the data connection 410 may be transmitted to the local server system 400 to be stored in the local storage resource 413.

As such, the hosted client session 411 of the server system 400 may be associated with multiple data connections. One or more of the data connections may include endpoints that are remote server systems that provide a server component for a remote storage resource and do not host the client session 411. However, one of the data connections may include an endpoint that is a local server system that provides a server component for a local storage resources and the local storage server may further host the client session 411.

Figure 5A:
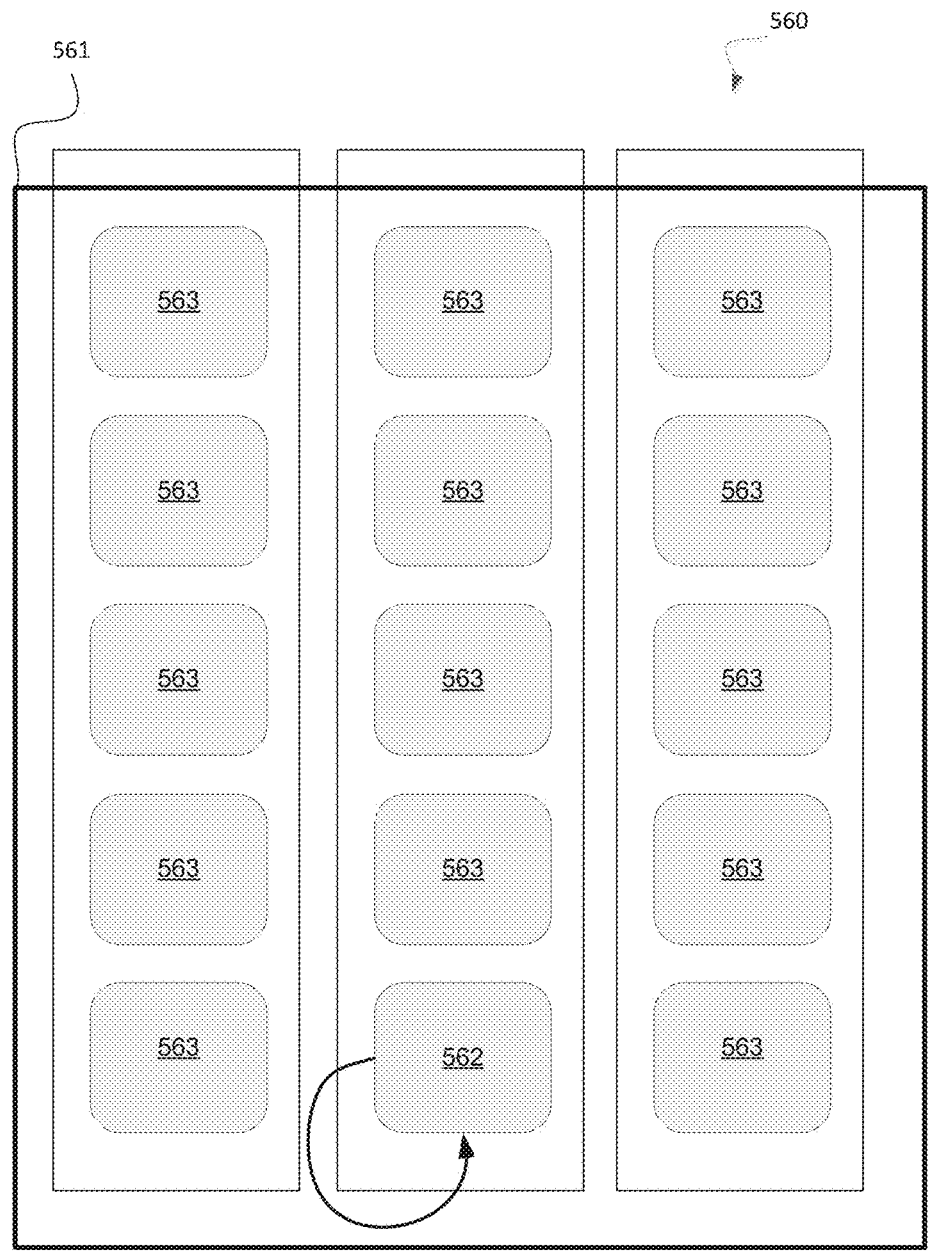
FIG. 5A is an illustrated example of a server system associated with a volume of a distributed file system in accordance with some embodiments.

FIG. 5A is an illustrated example of a server system associated with a volume of a distributed file system 560 in accordance with some embodiments. In general, the distributed file system 560 may include a volume 561 that is associated with server systems 562 and 563. The server systems 562 and 563 may correspond to server systems 110, 120, or 130.

As shown in FIG. 5A, the server systems 562 and 563 may each store files of a volume 561 of the distributed file system 560. If a client session is hosted by the server system 562 and the client session issues a write request to store data or files in the volume 561, the local identification of the server system 562 and the identification information of endpoints of data connections (e.g., server systems 563 and 562) may be received by a NUFA module associated with the client session. The NUFA module may identify the local identification of the server system 562 from the identification information received from the endpoints of the data connections and may thus store or create the data or file from the client session at a local storage resource of the server system 562. However, in some embodiments, the local identification received by the NUFA module may not match any of the received identification information received from the endpoints. In such a case, the server system that is hosting the client session may not be part of the volume, as is discussed in further detail below.

Figure 5B:
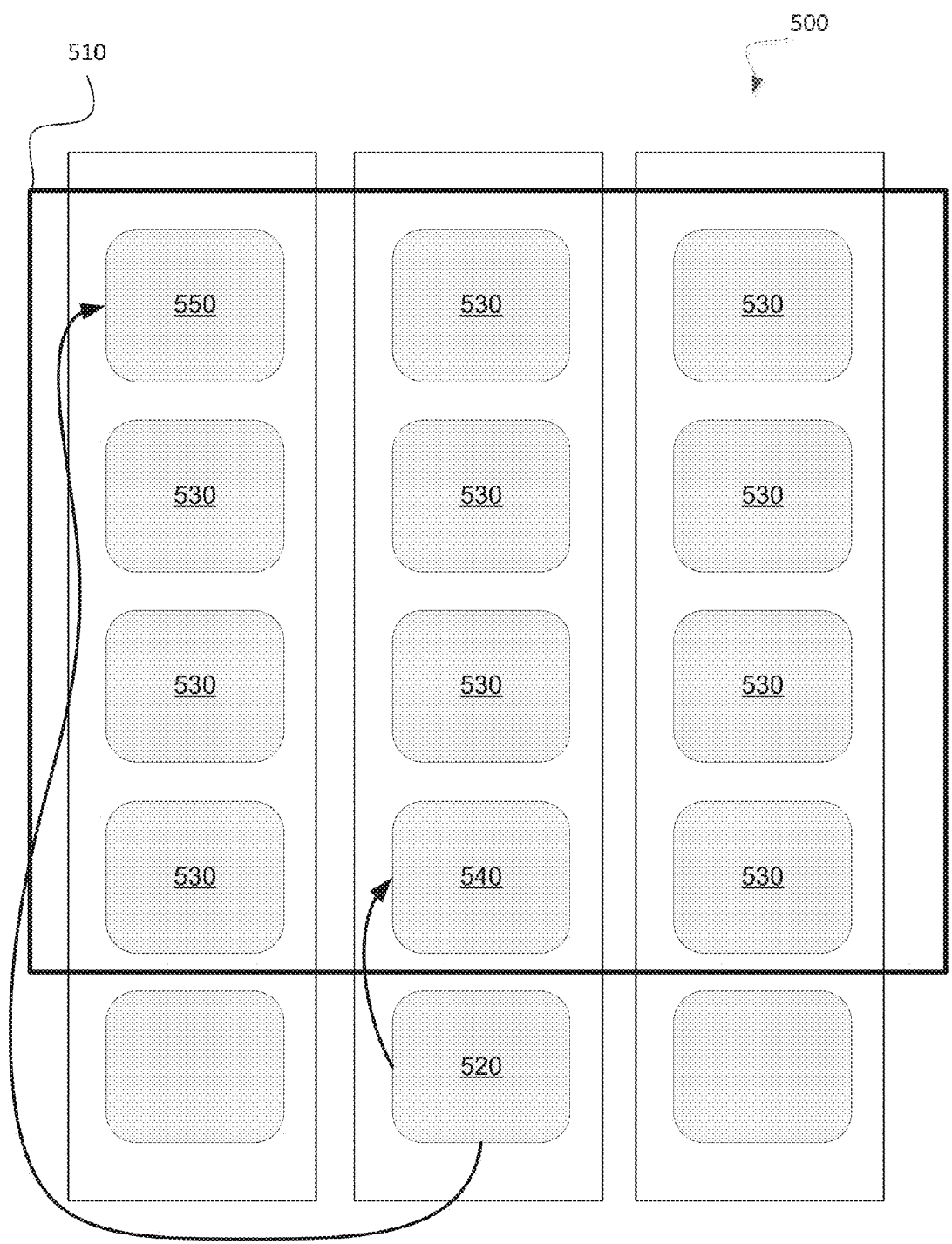
FIG. 5B is an illustrated example of storing a file in a distributed file system based on topology awareness of a top of rack switch in accordance with some embodiments.

FIG. 5B is an illustrated example of storing a file in a distributed file system 500 based on topology awareness of a top of rack switch. In general, the distributed file system 500 may include multiple server systems 520, 530, 540, and 550 that may correspond to server systems 110, 120, or 130.

As shown in FIG. 5B, the distributed file system 500 may be based on a top of rack system architecture. In some embodiments, a top of rack system architecture may include multiple server systems connected or coupled to one or more Ethernet or other network switches installed within a rack. For example, the top of rack system architecture may include multiple columns (also referred to as racks) where each column includes multiple server systems. Furthermore, each column of server systems may include at least one switch. In some embodiments, the switch may be included at the top of the column of the server systems. However, in alternative embodiments, the switch may be located at the bottom of the column of the server systems or may be located in the middle of a column of the server systems. In some embodiments, each of the server systems in each column of the top of rack system architecture may be capable of hosting a client session and/or a server component to support distributed file system functionality. In the same or alternative embodiments, a particular volume of the distributed file system may only be associated with a subset of the server systems of the distributed file system. For example, a volume may include files that are stored across a first set of storage resources associated with a first set of server systems and not within a second set of storage resources associated with a second set of server systems. However, a client session may be hosted by any server system within the first set of server systems and the second set of server systems. As such, in such an example, the client session may be able to access the volume from a local server system if the client session is hosted by one of the server systems in the first set of server systems, but the client session may only be able to remotely access the volume from a server system from the second set of server systems.

In some embodiments, the top of rack system architecture may be associated with non-uniform file access. For example, as previously described, the top of rack system architecture may include columns or racks of server systems. A particular server system may access data in the distributed file system by accessing a storage resource managed by another server system within the top of rack system architecture. However, in some embodiments, the access times or latencies for accessing data or files stored in a storage resource of another server system may vary based on the location of the server system, type of server system, etc. For example, a server system that is located within the same rack or column as another server system may be associated with lower access times or latencies for accessing data or files stored in storage resources that are managed by each of the server systems as opposed to a storage resource managed by another server system that is located in another rack or column. Furthermore, a first server system that is closer to a second server system may be associated with lower access times or latency than a third server system that is further away from the first server system.

Returning to FIG. 5B, a volume 510 may be stored across a first subset of server systems and not stored across a second subset of server systems of a distributed file system. For example, a volume 510 of a distributed file system may store data or files across storage resources that are managed by server systems 530, 540, and 550. However, the data or files of the volume 510 are not stored across the storage resource managed by the server system 520. As such, if a client session is hosted on the server system 520 and is accessing the volume 510, the server system 520 may be considered a remote server system with respect to the volume. In such a case, write requests to store data or files from a client session hosted at the server system 520 to the volume 510 may not be stored in the storage resource managed by the server system 520 and instead will need to be stored at server systems that manage storage resources that store data or files of the volume 510.

In some embodiments, a NUFA module of the server system 520 may store files to a particular storage resource of a particular server system of the volume 510 based on the identification information received from endpoints of the data connections from the client session hosted by the server system 520. For example, the NUFA module of the server system 520 may receive identification information of server systems 530, 540, and 550 and compare the identification information to a local identification. However, since the server system 520 is not managing any stored files of the volume 510, the identification information of the server system 520 will not be matched in the received identification information of the endpoints of the data connections. In response to not finding a match of the local identification within the received identification information of the endpoints, the NUFA module may use data or information of the endpoints (e.g., from the identification data sub-module 260) to determine which data connection to transmit data or files to be stored in the volume 510. For example, the data or information of the endpoints may identify characteristics of particular server systems. Examples of such data or information include, but are not limited to, a position of server systems (e.g., a rack or column and location within the rack or column), a type of the server system, a type of storage resource managed by the server system, etc.

As such, the identification information received from endpoints of the data connections from a client session and information associated with identified server systems may be used to determine which data connection data or files should be transmitted to and from the client session. For example, as shown in FIG. 2, the server system 520 may not be part of the volume 510. A client session may be hosted by the server system 520 and the client session may mount or enable access to the volume 510. In response to a write request to store data or files to the volume 510, a query may be transmitted to the endpoints of the data connections from the client session. For example, the data connections may include a data connection that couples the client session hosted on the server system 520 to the server system 550 and another data connection that couples the client session hosted on the server system 520 to the server system 540. The server systems 550 and 540 may transmit identification information to the server system 520 in response to receiving the query. The identification information of the server systems may then be used to identify corresponding records in the identification data sub-module 260. For example, from the records in the identification sub-module 260, the location of the server systems 550 and 540 may be determined. In some embodiments, the location of the server systems 550 and 540 may be compared to a location of the local server system 520. Based on the comparison of the locations, the client session hosted by the server system 520 may transmit data or files to one of the data connections. For example, since server system 540 is located within the same rack or column as the server system 520, the data or files from the client session may be transmitted to the data connection for the server system 540 to be stored in a storage resource managed by the server system 540 as opposed to transmitting the data or files over the data connection for the server system 550 to be stored in a storage resource managed by the server system 550.

Figure 6:
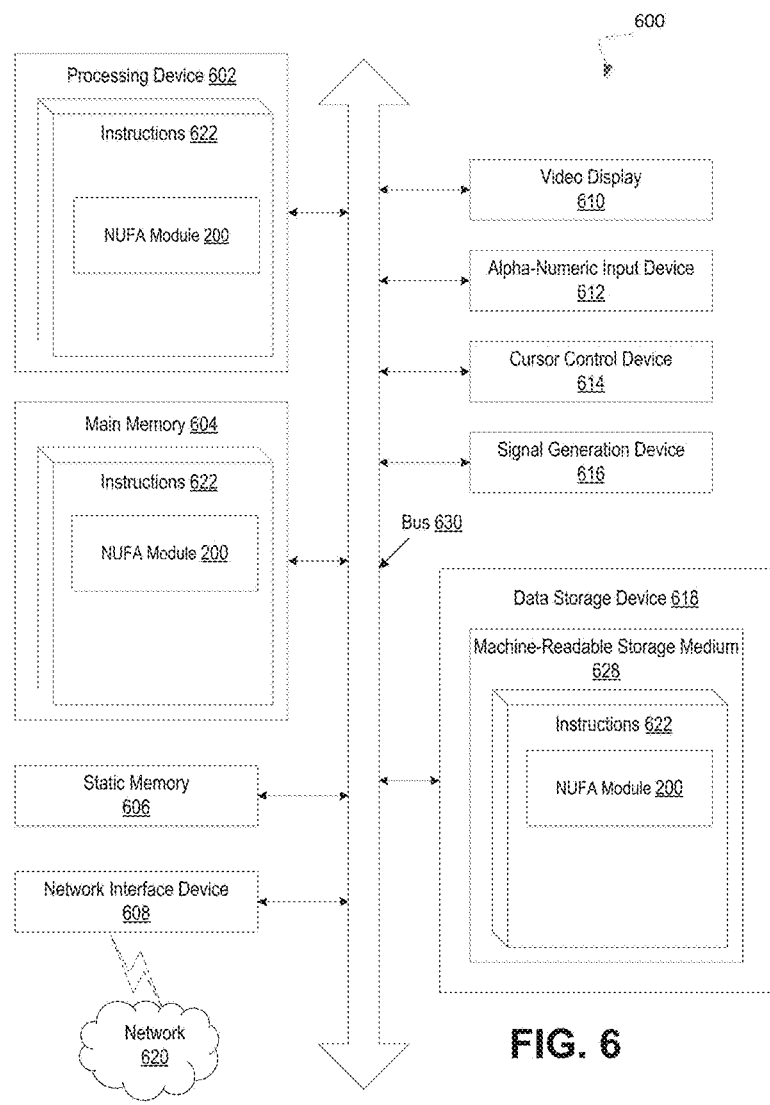
FIG. 6 illustrates a block diagram of an embodiment of a computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a NUFA module (e.g., NUFA modules 114, 124, of 134 of FIG. 1 and/or NUFA module 200 of FIG. 2) and/or a software library containing methods that call modules or sub-modules in a NUFA module. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    identifying a plurality of data connections associated with a remote login session;
    transmitting an identification query to endpoints of the plurality of data connections;
    receiving identification information from the endpoints of the plurality of data connections in response to the identification query;
    querying an operating system of a local server that is hosting the remote login session to obtain a local identification associated with the remote login session;
    comparing, by a processing device, the identification information received from the endpoints with the local identification associated with the remote login session; and
    storing a file at a first endpoint of a first data connection of the plurality of data connections in view of the comparison of the identification information received from the endpoints with the local identification, wherein the local identification matches at least a portion of the identification information received from the first endpoint of the first data connection, and wherein the first endpoint corresponds to the local server that is hosting the remote login session.

2. The method of claim 1, wherein a distributed file system comprises the local server that is hosting the remote login session, and the plurality of data connections are used to transmit files from the remote login session hosted on the local server of the distributed file system to storage resources of the distributed file system.

3. The method of claim 2, wherein the first data connection is used to transmit files between the remote login session and the local server and a second data connection of the plurality of data connections is used to transmit files between the remote login session and a remote server of the distributed file system.

4. The method of claim 1, wherein the file is created by the remote login session to be stored in a volume of a distributed file system.

5. The method of claim 1, wherein the identification information received from each of the endpoints comprises a first identifier corresponding to a first server and a second identifier corresponding to a second server.

6. The method of claim 1, wherein the local server manages a first storage resource of a distributed file system and the first data connection couples the remote login session with the first storage resource, and a remote server manages a second storage resource of the distributed file system and a second data connection couples the remote login session with the second storage resource, wherein each of the first storage resource and the second storage resource stores portions of a volume of the distributed file system, and wherein files written by the remote login session are stored in the first storage resource via the first data connection.

7. The method of claim 1, further comprising:
    identifying a volume with files stored at a plurality of servers of a distributed file system;
    determining whether the local server that is hosting the remote login session is one of the plurality of servers of the distributed file system that is storing files of the volume, wherein the storing of the file at the first endpoint is further in view of determining that the local server that is hosting the remote login session is one of the plurality of servers that is storing the files of the volume.

8. A system, comprising:
    a memory to store identification information; and
    a processing device, operatively coupled with the memory, to:
        identify a plurality of data connections associated with a remote login session;
        transmit an identification query to endpoints of the plurality of data connections;
        receive the identification information from the endpoints of the plurality of data connections in response to the identification query;
        query an operating system of a local server that is hosting the remote login session to obtain a local identification associated with the remote login session;
        compare the identification information received from the endpoints with the local identification associated with the remote login session; and
        store a file at a first endpoint of a first data connection of the plurality of data connections in view of the comparison of the identification information received from the endpoints with the local identification, wherein the local identification matches at least a portion of the identification information received from the first endpoint of the first data connection, and wherein the first endpoint corresponds to the local server that is hosting the remote login session.

9. The system of claim 8, wherein a distributed file system comprises the local server that is hosting the remote login session, and the plurality of data connections are used to transmit files from the remote login session hosted on the local server of the distributed file system to storage resources of the distributed file system.

10. The system of claim 9, wherein the first data connection is used to transmit files between the remote login session and the local server and a second data connection of the plurality of data connections is used to transmit files between the remote login session and a remote server of the distributed file system.

11. The system of claim 8, wherein the file is created by the remote login session to be stored in a volume of a distributed file system.

12. The system of claim 8, wherein the identification information received from each of the endpoints comprises a first identifier corresponding to a first server and a second identifier corresponding to a second server.

13. The system of claim 8, wherein the local server manages a first storage resource of a distributed file system and the first data connection couples the remote login session with the first storage resource, and a remote server manages a second storage resource of the distributed file system and a second data connection couples the remote login session with the second storage resource, wherein each of the first storage resource and the second storage resource stores portions of a volume of the distributed file system, and wherein files written by the remote login session are stored in the first storage resource via the first data connection.

14. A non-transitory machine-readable storage medium comprising data that, when accessed by a processing device, cause the processing device to:
  identify a plurality of data connections associated with a remote login session;
  transmit an identification query to endpoints of the plurality of data connections;
  receive identification information from the endpoints of the plurality of data connections in response to the identification query;
  query an operating system of a local server that is hosting the remote login session to obtain a local identification associated with the remote login session;
  compare, by the processing device, the identification information received from the endpoints with the local identification associated with the remote login session; and
  store a file at a first endpoint of a first data connection of the plurality of data connections in view of the comparison of the identification information received from the endpoints with the local identification, wherein the local identification matches at least a portion of the identification information received from the first endpoint of the first data connection, and wherein the first endpoint corresponds to the local server that is hosting the remote login session.

15. The non-transitory machine-readable storage medium of claim 14, wherein a distributed file system comprises the local server that is hosting the remote login session, and the plurality of data connections are used to transmit files from the remote login session hosted on the local server of the distributed file system to storage resources of the distributed file system.

16. The non-transitory machine-readable storage medium of claim 15, wherein the first data connection is used to transmit files between the remote login session and the local server and a second data connection of the plurality of data connections is used to transmit files between the remote login session and a remote server of the distributed file system.

17. The non-transitory machine-readable storage medium of claim 14, wherein the identification information received from each of the endpoints comprises a first identifier corresponding to a first server and a second identifier corresponding to a second server.

18. The non-transitory machine-readable storage medium of claim 14, wherein the local server manages a first storage resource of a distributed file system and the first data connection couples the remote login session with the first storage resource, and a remote server manages a second storage resource of the distributed file system and a second data connection couples the remote login session with the second storage resource, wherein each of the first storage resource and the second storage resource stores portions of a volume of the distributed file system, and wherein files written by the remote login session are stored in the first storage resource via the first data connection.

\* \* \* \* \*